(12) United States Patent
Shimbo (10) Patent No.: US 6,415,139 B1
(45) Date of Patent: Jul. 2, 2002

(54) DETECTION CIRCUIT OF TONE SIGNAL

(75) Inventor: Atsushi Shimbo, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/198,379

(22) Filed: Nov. 24, 1998

(30) Foreign Application Priority Data

Nov. 26, 1997 (JP) .............................................. 9-340619

(51) Int. Cl.[7] .................................................. H04B 1/16
(52) U.S. Cl. ........................ 455/229; 455/227; 455/307; 379/386
(58) Field of Search ................................. 455/229, 296, 455/212, 213, 301, 307, 227, 283, 225; 379/283, 386

(56) References Cited

U.S. PATENT DOCUMENTS

| 4,067,013 A | * | 1/1978 | Smith ......................... 343/7.7 |
| 5,461,383 A | * | 10/1995 | Ono et al. ..................... 342/20 |
| 5,465,413 A | * | 11/1995 | Enge et al. .................. 455/307 |
| 5,564,093 A | * | 10/1996 | Matsumoto .................. 455/266 |
| 5,592,544 A | * | 1/1997 | Murata et al. ............... 379/283 |
| 5,818,929 A | * | 10/1998 | Yaguchi ...................... 379/418 |
| 6,006,083 A | * | 12/1999 | Tong et al. .................. 455/401 |
| 6,026,419 A | * | 2/2000 | Hasegawa .................... 708/312 |

* cited by examiner

*Primary Examiner*—William Trost
*Assistant Examiner*—Philip J. Sobutka
(74) *Attorney, Agent, or Firm*—Rabin & Berdo, P.C.

(57) ABSTRACT

This invention intends to provide a tone signal detection circuit that accurately detects a tone signal regardless of a reception electric field strength. To accomplish this object, the tone signal detection circuit according to the invention is comprised of a first filter that extracts a signal of a specific frequency from an input signal, a second filter that excludes the signal of the specific frequency from the input signal and extracts signals of frequencies near the specific frequency, a subtractor that subtracts an output of the second filter from an output of the first filter, and a judgment circuit to judge whether the tone signal is present or not in the input signal on the basis of an output from the subtractor.

8 Claims, 6 Drawing Sheets

DETECTION CIRCUIT OF TONE SIGNAL

BACKGROUND OF THE INVENTION

1. Field of the Invention

The present invention relates to a circuit that detects a tone signal. Specifically, the invention relates to a tone signal detection circuit used in an FM receiver or an FM portable telephone.

2. Description of the Related Art

A communication system using an FM receiver, FM portable telephone, or the like employs a tone signal in order to determine if a call is permissible.

The operation of a conventional tone signal detection means is as follows. First, a bandpass filter extracts a signal of a desired tone frequency band from an input signal. The extracted signal of the desired tone frequency band is then converted into a signal of a level corresponding to the amplitude of the extracted signal. When the level is more than a predetermined threshold, the input signal is judged to contain the tone signal.

However, the foregoing conventional detection means cannot discriminate noise from the tone signal, in case there are noise components near the passband of the bandpass filter, especially in FM radio communication systems in which, as the reception electric field strength decreases, the white noises of the signal increase and the signal decreases. From such circumstances, a tone signal detection circuit has been expected which can accurately detect a tone signal regardless of the reception electric field strength.

SUMMARY OF THE INVENTION

It is therefore an object of the present invention to provide a tone signal detection circuit that accurately detects the tone signal regardless of the reception electric field strength.

In order to accomplish the foregoing object, the tone signal detection circuit according to the invention is comprised of: a first filter that extracts a signal of a specific frequency from an input signal, a second filter that excludes the signal of the specific frequency from the input signal and extracts signals of other frequencies near the specific frequency, a subtractor that subtracts an output of the second filter from an output of the first filter, and a judgment circuit that judges the presence of the tone signal in the input signal on the basis of an output from the subtractor.

DESCRIPTION OF THE PREFERRED EMBODIMENT

Preferred embodiments of the present invention will hereafter be described in detail with reference to the accompanying drawings.

A first example of the tone signal detection circuit according to the present invention will be described with reference to FIG. 1.

The concrete example 1 of the tone signal detection circuit consists of a first filter 1, a second filter 2, a first level converter 3, a second level converter 4, a judgment circuit 5, and a subtractor 6.

The first filter 1 extracts and outputs a signal including the frequency of a predetermined tone signal. The second filter 2 passes signals that include other frequencies near the frequency detected by the first filter 1 but exclude the detected frequency itself. The first level converter 3 measures a level of the output signal from the filter 1. The second level converter 4 measures a level of the output signal from the filter 2.

The subtractor 6 subtracts an output of the second level converter 4 from an output of the first level converter 3. The judgment circuit 5 judges on the basis of an output from the subtractor 6, for example, that the tone signal is present when the output from the subtractor 6 is more than a specific level, and that the tone signal is not present when the output from the subtract or 6 is less than the specific level. In the drawing, reference numeral 7 indicates an input terminal where the tone signal and signals including noises are input, and reference numeral 8 indicates an output terminal from where the judgment result of the tone signal is output.

The operation of the tone signal detection circuit of the first example will now be described.

The tone signal having noises superposed thereon is input to the first filter 1 and the second filter 2 through the input terminal 7.

Figure 2:
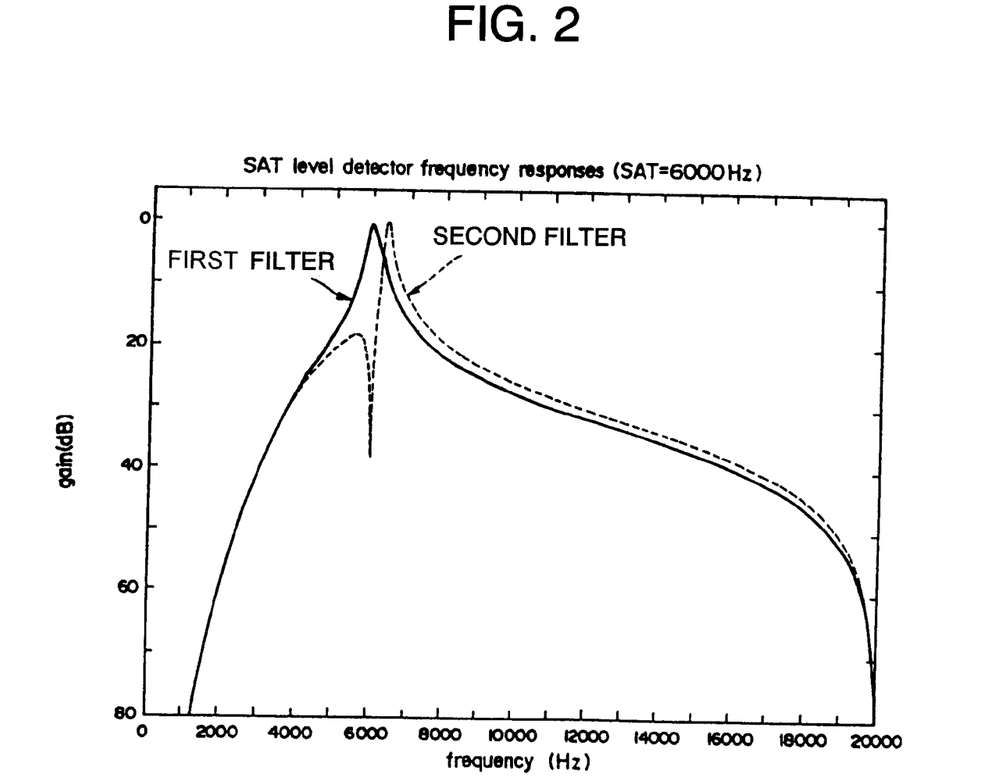
FIG. 2 is a chart to explain the filter characteristic in the tone signal detection circuit according to the present invention.

FIG. 2 is a chart to illustrate the characteristics of the first filter 1 and the second filter 2, when the tone signal is set at 6000 Hz. The first filter 1 possesses a frequency passband of which the center frequency is 6000 Hz. The second filter 2 possesses a passband of frequencies near 6000 Hz excluding 6000 Hz. Accordingly, the first filter 1 outputs the "tone signal + noises", and the second filter 2 outputs the "noises".

The outputs from the first filter 1 are converted into signals of levels corresponding to its amplitudes by the first level converter 3. The outputs from the second filter 2 are converted into signals of levels corresponding to its amplitudes by the second level converter 4. The subtractor 6 subtracts the output level of the second filter 2 from the output level of the first filter 1. That is, the subtractor 6 subtracts the level of the "noises" from the level of the "tone signal + noises", and outputs the level of the tone signal. The judgment circuit 5 judges the level of the tone signal to thereby detect the tone signal.

Figure 3:
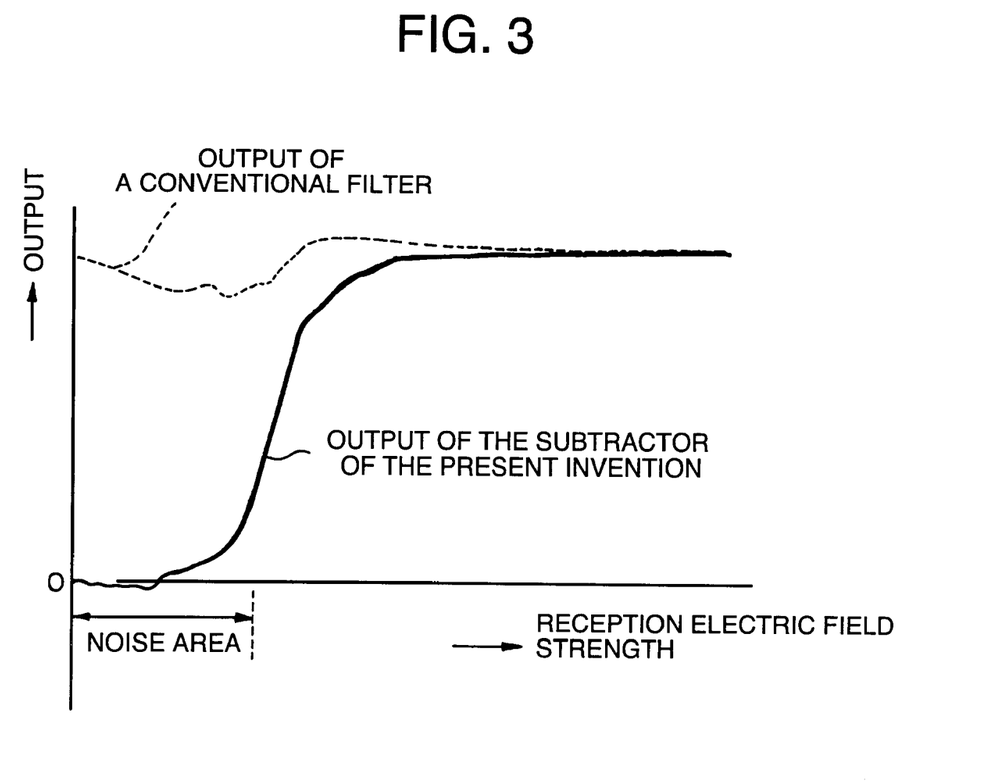
FIG. 3 is a chart to compare the operation of the tone signal detection circuit according to the invention and that of the conventional detection circuit.

FIG. 3 is a chart that compares the operation of the tone signal detection circuit according to the invention with that of the conventional detection circuit.

The curve shown by the dotted line illustrates an output of the conventional bandpass filter, and the curve shown by the solid line illustrates an output of the subtractor 6 according to the first example of the present invention. As shown in the drawing, in the conventional filter, the level of the filter output in the noise area is almost the same as the output level obtained in the strong electric field. That is, in the conventional filter, it is difficult to detect the signal in the noise area. In the first example of the present invention on the other hand, the filter output level in the noise area is substantially different from the output level in the strong electric field. Accordingly, the first example of the present invention discriminates the noise area from the strong electric field. Further, when this example is applied to an FM receiver and even if there are dispersions in the noise levels by each unit, the noise components can be removed, and accordingly the tone signal can be stably detected.

The second example of the present invention will be described below.

Figure 4:
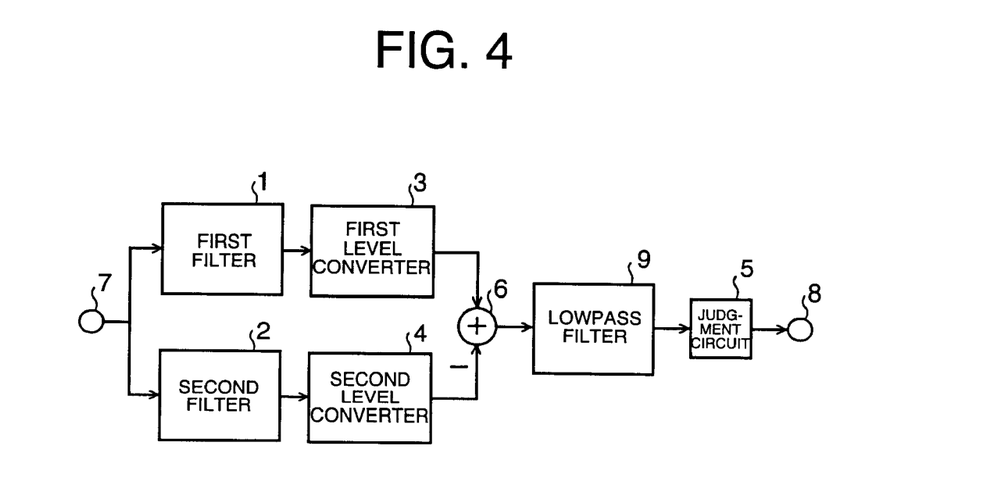
FIG. 4 is a block diagram to illustrate a second example of the tone signal detection circuit according to the present invention.

FIG. 4 is a block diagram illustrating a second example of the tone signal detection circuit according to the invention.

Figure 1:
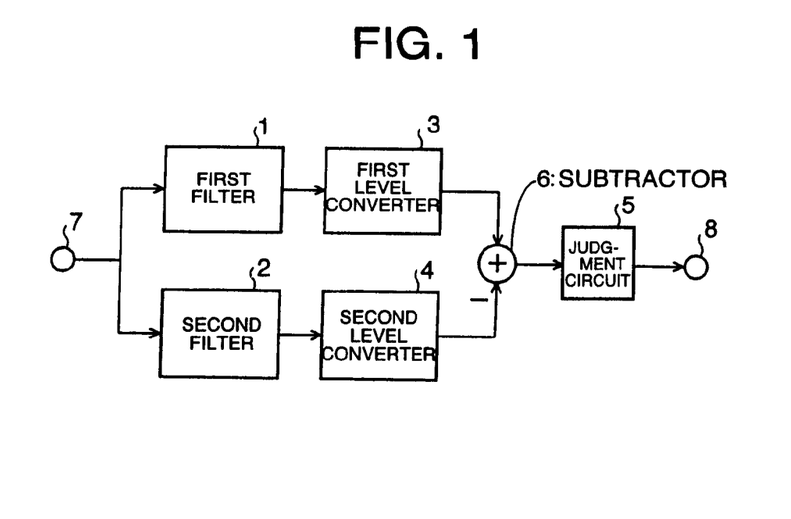
FIG. 1 is a block diagram to illustrate an example of the tone signal detection circuit according to the present invention.

The present example has a lowpass filter 9 added on the prior stage of the judgment circuit 5, in contrast to the configuration of the first example shown in FIG. 1. The lowpass filter 9 smoothes the output from the subtractor 6. The smoothing time constant of the lowpass filter 9 is appropriately determined according to the condition of use, or the like. The other configuration is the same as that of the first example of FIG. 1, and the description will be omitted.

The operation of the tone signal detection circuit of the second example will be described below.

The operation of the second example from when a signal is input to the input terminal 7 until when the signal is output from the subtractor 6 is the same as that of the first example of FIG. 1, and the description will be omitted. The level of a tone signal calculated by the subtractor 6 is smoothed by the lowpass filter 9, and the output therefrom is input to the judgment circuit 5. The judgment circuit 5 judges the level of the tone signal to thereby detect the tone signal. The interpolation of the lowpass filter 9 will prevent the judgment circuit 5 from outputting the judgment result, "tone signal absent", in the case that the tone signal is not momentarily input due to the fading phenomenon or the like.

The third example of the present invention will be described below.

Figure 5:
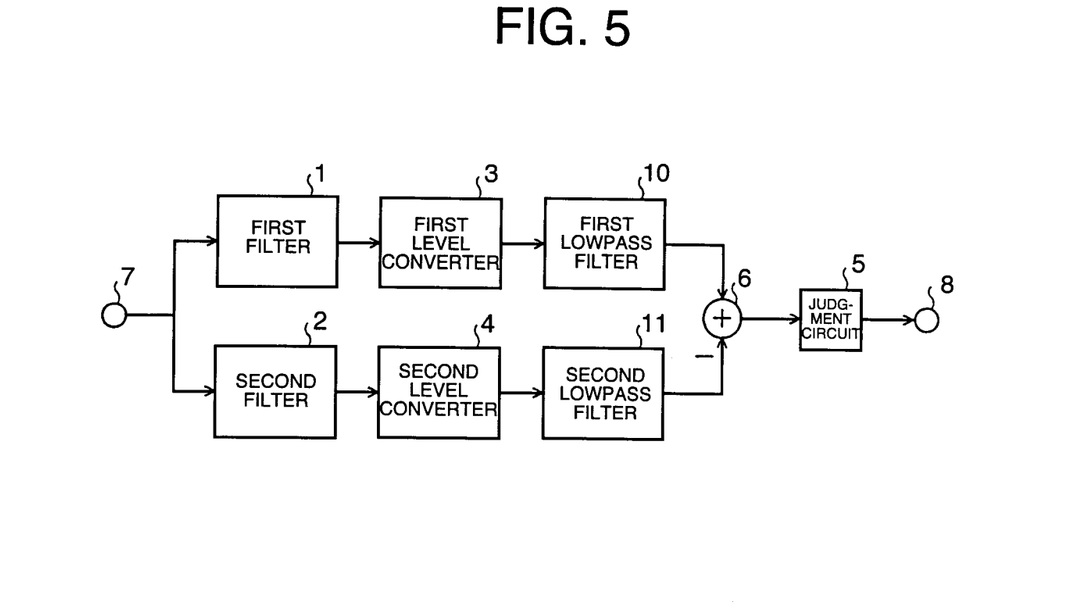
FIG. 5 is a block diagram to illustrate a third example of the tone signal detection circuit according to the present invention.

FIG. 5 is a block diagram illustrating third example of the tone signal detection circuit according to the present invention.

The third example has a first lowpass filter 10 added on the output of the first level converter 3 and a second lowpass filter 11 added on the output of the second level converter 4, in contrast to the configuration of the first example of FIG. 1.

The first lowpass filter 10 and the second lowpass filter 11 smooth the output from the first level converter 3 and the output from the second level converter 4, respectively. The other configuration is the same as that of the example of FIG. 1, and the description will be omitted.

The operation of the tone signal detection circuit of the third example will be described below.

The operation of the concrete example 3 from when a signal is input from the input terminal 7 until when the first filter 1 outputs the "tone signal + noises" and the second filter 2 outputs the "noises" is the same as that of the first example of FIG. 1, and the description will be omitted. The first lowpass filter 10 calculates the average level of the "tone signal + noises" output from the first level converter 3. The second lowpass filter 11 calculates the average level of the "noises" output from the second level converter 4. The average levels calculated by the first and second lowpass filters 10, 11 are output to the subtractor 6. The subtractor 6 subtracts the output level of the second level converter 4 from the output level of the first level converter 3. That is, the subtractor 6 subtracts the average level of the "noises" from the average level of the "tone signal + noises", and outputs the average level of the tone signal. The judgment circuit 5 judges the average level of the tone signal to thereby detect the tone signal.

The interpolation of the first lowpass filter 10 and the second lowpass filter 11 will prevent the judgment circuit 5 from outputting the judgment result, "tone signal absent", when the tone signal is not momentarily input due to the fading phenomenon or the like. Further, the filtering by each lowpass filter is individually processed to each of the outputs from the first filter 1 and the second filter 2 and accordingly, when the variation of the tone signal is different from that of noises found in nature, an optimized lowpass filter can be designed to each of them. Consequently, this circuit configuration makes it possible to achieve a circuit having a higher detection accuracy.

The fourth example of the present invention will be described below.

Figure 6:
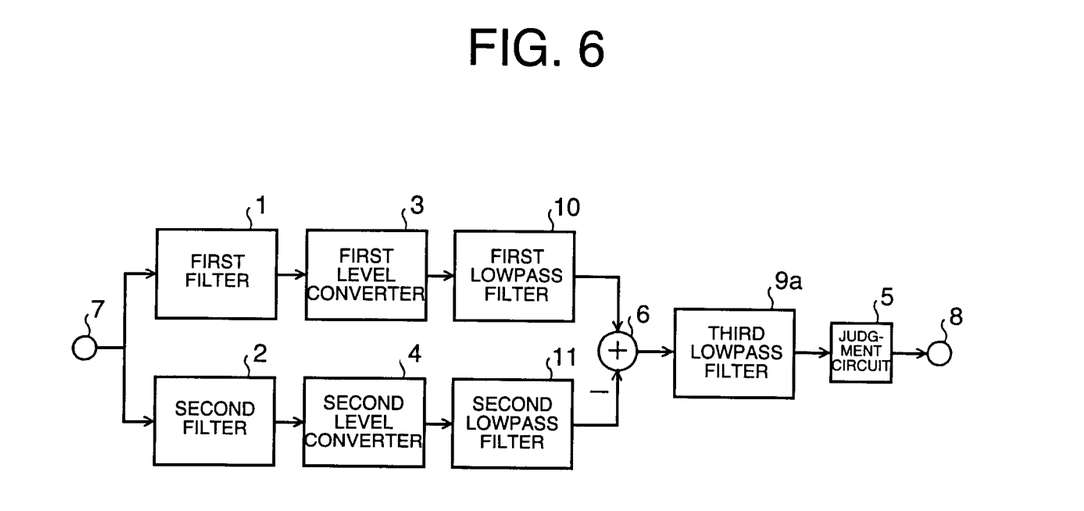
FIG. 6 is a block diagram to illustrate a fourth example of the tone signal detection circuit according to the present invention.

FIG. 6 is a block diagram to illustrate a fourth example of the tone signal detection circuit according to the invention.

The concrete example 4 has a third lowpass filter 9a added on the prior stage of the judgment circuit 5, in contrast to the configuration of the third example of FIG. 5. The lowpass filter 9a smoothes the output from the subtractor 6. The smoothing time constant of the lowpass filter 9a is appropriately determined according to the condition of use, or the like. The other configuration is the same as that of the foregoing third example, and the description will be omitted.

The operation of the tone signal detection circuit of the fourth example will be described.

The operation of the fourth example from when a signal is input to the input terminal 7 until when the signal is output from the subtractor 6 is the same as that of the concrete example 3, and the description will be omitted. The level of a tone signal calculated by the subtractor 6 is smoothed by the lowpass filter 9a, and the output therefrom is input to the judgment circuit 5. The judgment circuit 5 judges the level of the tone signal to thereby detect the tone signal. The tuning of the time constant of the lowpass filter 9a makes it possible to set the time for detecting the tone signal. Accordingly, this circuit configuration makes it possible to achieve a circuit having a higher detection accuracy.

The fifth example of the present invention will be described below.

Figure 7:
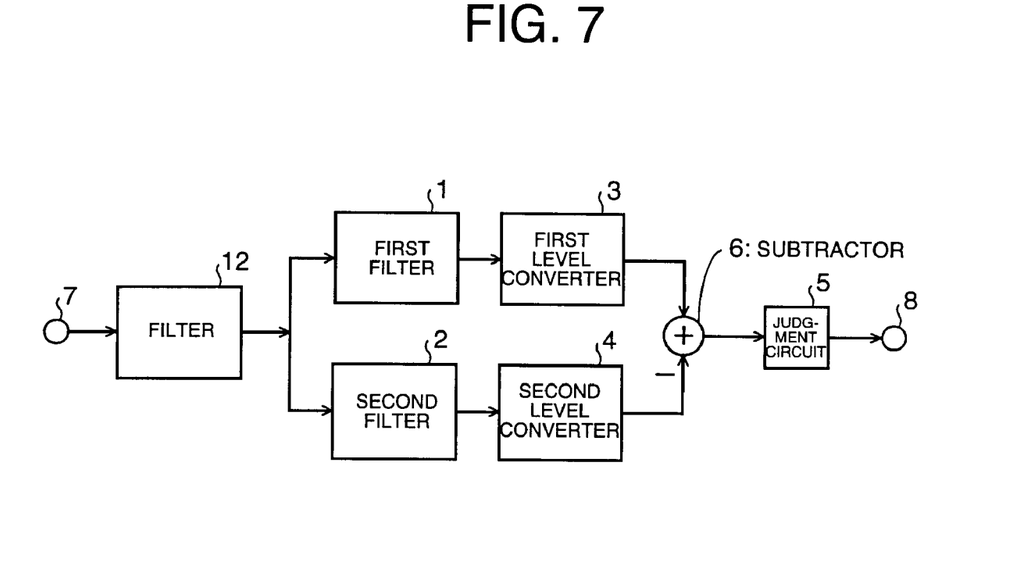
FIG. 7 is a block diagram to illustrate a fifth example of the tone signal detection circuit according to the present invention.

FIG. 7 is a block diagram illustrating a fifth example of the tone signal detection circuit according to the present invention.

The fifth example has a filter 12 added on after the input terminal 7, in contrast to the configuration of the first example of FIG. 1. This filter 12 limits signals within, for example, 300 Hz to 3400 Hz being the frequency band of human voices. The other configuration is the same as that of the first example of FIG. 1, and the description will be omitted.

The operation of the tone signal detection circuit of the fifth example will be described below.

The tone signal having noises superposed thereon is input to the first filter 12 through the input terminal 7. The filter 12 limits the frequency band of the signals input thereto, and outputs the signal processed by the filter 12 to the first level converter 3 and the second level converter 4. The operation after this stage is the same as that of the first example of FIG. 1, and the description will be omitted. The interpolation of the filter 12 will remove the influence of the signals within the frequency band that the filter 12 limits on the tone signal. That is, setting the frequency band of the voice signal as a frequency band that the filter 12 limits removes the influence of the voice signal on the tone signal, when the tone signal and the voice signal overlap each other and input.

The judgment circuit 5 used in the examples of FIGS. 1 and 4–7 through 5 will be described below.

Figure 8:
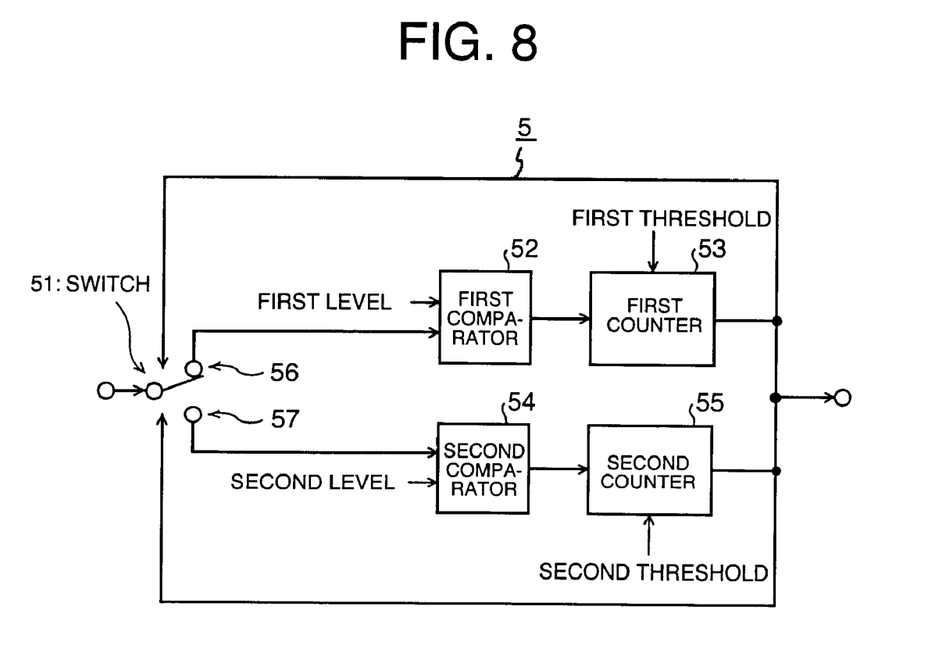
FIG. 8 is a block diagram of judgment circuit.

FIG. 8 is a block diagram of the judgment circuit 5.

The judgment circuit 5 consists of a switch 51, a first comparator 52, a first counter 53, a second comparator 54, and a second counter 55.

The first comparator 52 compares a level of an output signal from the subtractor 6 with a predetermined first level, and outputs an ON-signal when the level of the output signal from the subtractor 6 is more than the first level. The first counter 53 counts a frequency during which the ON-signal output from the first comparator 52 continues, and outputs a judgment result of "tone signal present" when the continued frequency is more than a predetermined first threshold.

The second comparator 54 compares the level of the output signal from the subtractor 6 with a second level that is predetermined at a lower value than the first level, and outputs an OFF-signal when the level of the output signal from the subtractor 6 is less than the second level. The second counter 55 counts a frequency during which the OFF-signal output from the second comparator 54 continues, and outputs a judgment result of "tone signal absent" when the continued frequency is more than a predetermined second threshold.

The switch 51 is connected to the terminal 57 when the first counter 53 outputs the judgment result "tone signal present", so that the output signal from the subtractor 6 is supplied to the second comparator 54. And, the switch 51 is connected to the terminal 56 when the second counter 55 outputs the judgment result "tone signal absent", so that the output signal from the subtractor 6 is supplied to the first comparator 52.

Figure 9:
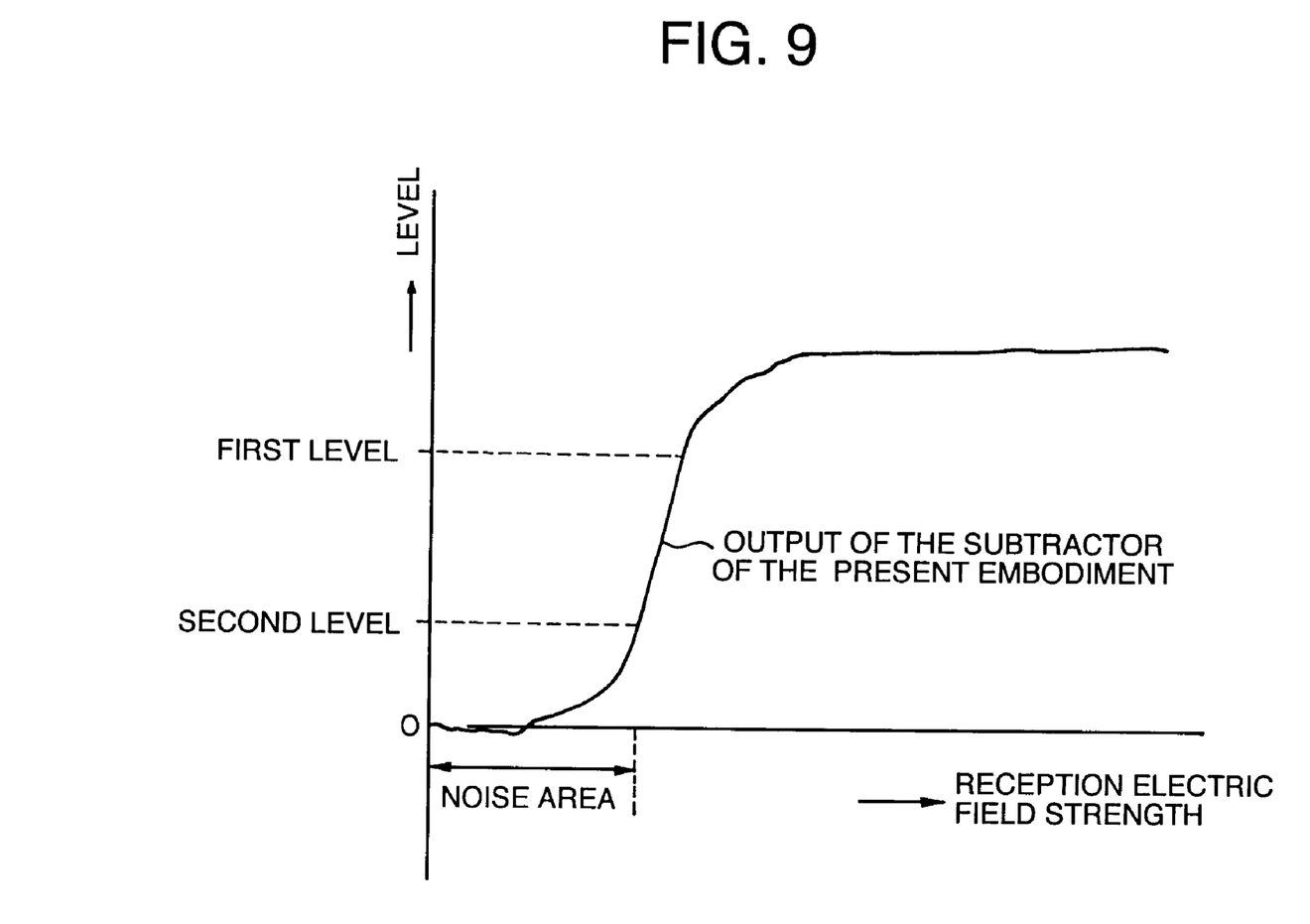
FIG. 9 is a chart to explain a first threshold and a second threshold in the judgment circuit of FIG. 8.

The first level and the second level will be described with reference to FIG. 9. As shown in the drawing, the first level is sufficiently higher than the level in the noise area, and the second level is equivalent approximately to the upper limit of the level in the noise area.

The operation of the judgment circuit 5 will be described.

When the tone signal is not yet detected, the switch 51 is connected to the terminal 56. The input signal to the judgment circuit 5 is input to the first comparator 52 through the switch 51. The first comparator 52 compares the input signal level with the first level at every specified time. The first comparator 52 outputs the ON-signal when the input signal level is more than the first level, and outputs the OFF-signal When the input signal level is less than the first level. The first counter 53 counts a frequency during which the ON-signal output from the first comparator 52 continues, outputs the "tone signal present" as the judgment result when the continued frequency is more than the first threshold, and switches the connection of the switch 51 into the terminal 57.

When the switch 51 is connected to the terminal 57, the input signal to the judgment circuit 5 is input to the second comparator 54 through the switch 51. The second comparator 54 compares the input signal level with the second level at every specified time. The second comparator 54 outputs the ON-signal when the input signal level is more than the second level, and outputs the OFF-signal when the input signal level is less than the second level. The second counter 55 counts a frequency during which the OFF-signal output from the second comparator 54 continues, outputs the "tone signal absent" as the judgment result when the continued frequency is more than the second threshold, and switches the connection of the switch 51 into the terminal 56.

Carrying out such an operation, the judgment circuit 5 outputs the judgment result of "tone signal present" when the reception field strength is sufficiently strong and this strength is stable. When the tone signal is not input continuously for a certain period, the judgment circuit 5, outputs the judgment result of "tone signal absent". The application of the judgment circuit 5 to the examples of FIGS. 1 and 4–7 makes it possible to detect the tone signal fluctuating near the detection frequency reliably with a least detection time.

A sixth example of the present invention will be described below.

Figure 10:
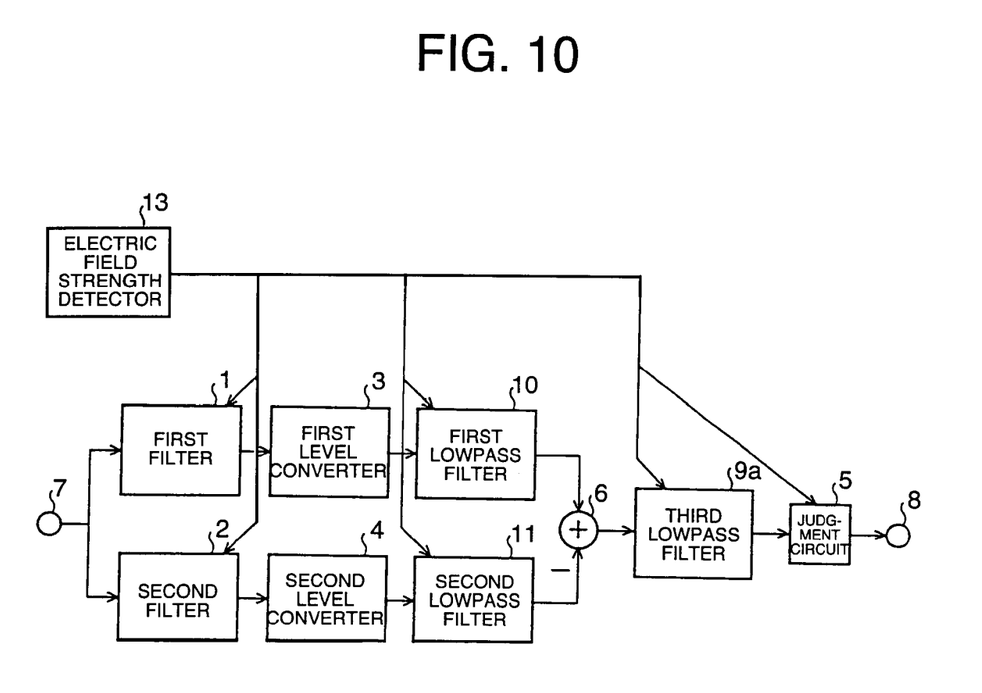
FIG. 10 is a block diagram to illustrate a sixth example of the tone signal detection circuit according to the present invention.

FIG. 10 is a block diagram illustrating a sixth example of the tone signal detection circuit according to the present invention.

The sixth example has an electric field strength detector 13 added on, in contrast to the configuration of the foregoing example of FIG. 6. This field strength detector 13 detects an electric field strength of a reception signal, and on the basis of the detected electric field strength controls the characteristic of the first filter 1, the characteristic of the second filter 2, the characteristic of the first lowpass filter 10, the characteristic of the second lowpass filter 11, the characteristic of the third lowpass filter 9a, and the first and the second level and the first and the second threshold of the judgment circuit 5. The other configuration on the drawing is the same as that of the example of FIG. 6, and the description will be omitted.

The operation of the tone signal detection circuit of the sixth example will be described below.

The electric field strength detector 13 detects an electric field strength of a reception signal, and the detector 13 carries out the following controls on the basis of the detected value. As to the first filter 1 and the second filter 2, the detector 13 sharpens the filter characteristic (value of Q) when the field strength is weak, and broadens the filter characteristic when the field strength is strong. As to the first lowpass filter 10, the second lowpass filter 11, and the third lowpass filter 9a, the detector 13 controls the time constant so as to decrease the smoothness when the field strength is strong, and to increase the smoothness when the field strength is weak. As to the first level and the second level of the judgment circuit 5, the detector 13 sets the first level to a slightly lower level and sets the second level to a slightly higher level when the field strength is strong and sets the first level to a slightly higher level and sets the second level to a slightly lower level when the field strength is weak. As to the first threshold and the second threshold of the judgment circuit 5, the detector 13 sets to a slightly lower value when the field strength is strong, and sets to a slightly higher value when the field strength is weak. As a result, the judgment circuit 5 sets the value such that the judgment result is obtained in a shorter time when the field strength is strong, and sets the value such that the judgment accuracy is improved when the field strength is weak.

The foregoing examples have been described as the tone detection circuit of the present invention. Since the tone detection circuit of this invention is able to detect the level of "tone signal + noises" and the level of "noises", it is also able to calculate the S/N ratio being the ratio of the two levels. That is, the tone detection circuit can be applied as an S/N detection circuit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tone signal detection circuit, comprising:
    a first filter that extracts, from an input signal, a band of signals including a signal having a specific frequency
    a second filter that extracts, from the input signal, a band of signals that overlap the band of signals extracted by said first filter, excluding the signal having the specific frequency;
    a subtractor that subtracts the band of signals extracted by said second filter from the band of signals extracted by said first filter and outputs a subtraction signal; and
    a judgment circuit that judges whether a tone signal is present or not in the input signal on the basis of the subtraction signal, wherein said judgment circuit comprises:
        a first comparator that compares a level of the subtraction signal with a first level at every occurrence of a specified time interval, outputs an ON-signal when the level of the subtraction signal is greater than the first level, and outputs an OFF-signal when the level of the subtraction signal is less than the first level;
        a first counter that counts a frequency during which the ON-signal that is output from said first comparator continues, and outputs a first judgment result indicating that the tone signal is present to an output terminal only when the continued frequency is greater than a first threshold frequency level;
        a second comparator that compares the level of the subtraction signal with a second level at every occurrence of a specified time interval, outputs the ON-signal when the level of the subtraction signal is greater than the second level, and outputs the OFF-signal when the level of the subtraction signal is less than the second level;
        a second counter that counts a frequency during which the OFF-signal, that is output from said second comparator continues, and outputs a second judgment result indicating that the tone signal is absent to the output terminal only when the continued frequency is greater than a second threshold frequency level; and
        a switch that switches the subtraction signal so as to be input to said second comparator when said first counter outputs the first judgment result indicating that the tone signal is present, and switches the subtraction signal so as to be input to said first comparator when said second counter outputs the second judgment result indicating that the tone signal is absent.

2. A tone signal detection circuit as claimed in claim 1, further comprising an electric field strength detection circuit that controls, on the basis of an input electric field strength, a characteristic of said first filter, a characteristic of said second filter, and the first level, the second level, the first threshold frequency level, and the second threshold frequency level of said judgment circuit.

3. A tone signal detection circuit, comprising:
    a first filter that extracts, from an input signal, a band of signals including a signal having a specific frequency;
    a second filter that extracts, from the input signal, a band of signals that overlap the band of signals extracted by said first filter, excluding the signal having the specific frequency;
    a subtractor that subtracts the band of signals extracted by said second filter from the band of signals extracted by said first filter and outputs a subtraction signal;
    a lowpass filter that smoothes an output of said subtractor to produce a smoothed subtractor output signal; and
    a judgment circuit which judges whether the tone signal is present or not in the input signal on the basis of the smoothed subtractor output signal produced by said lowpass filter, wherein said judgment circuit comprises:
        a first comparator that compares a level of the subtraction signal with a first level at every occurrence of a specified time interval, outputs an ON-signal when the level of the subtraction signal is greater than the first level, and outputs an OFF-signal when the level of the subtraction signal is less than the first level;
        a first counter that counts a frequency during which the ON-signal that is output from said first comparator continues, and outputs a first judgment result indicating that the tone signal is present to an output terminal only when the continued frequency is greater than a first threshold frequency level;
        a second comparator that compares the level of the subtraction signal with a second level at every occurrence of a specified time interval, outputs the ON-signal when the level of the subtraction signal is greater than the second level, and outputs the OFF-signal when the level of the subtraction signal is less than the second level;
        a second counter that counts a frequency during which the OFF-signal that is output from said second comparator continues, and outputs a second judgment result indicating that the tone signal is absent to the output terminal only when the continued frequency is greater than a second threshold frequency level; and
        a switch that switches the subtraction signal so as to be input to said second comparator when said first counter outputs the first judgment result indicating that the tone signal is present, and switches the subtraction signal so as to be input to said first comparator when said second counter outputs the second judgment result indicating that the tone signal is absent.

4. A tone signal detection circuit as claimed in claim 3, further comprising an electric field strength detection circuit that controls, on the basis of an input electric field strength, a characteristic of said first filter, a characteristic of said second filter, and the first level, the second level, the first threshold frequency level, and the second threshold frequency level of said judgment circuit.

5. A tone signal detection circuit, comprising:
    a first filter that extracts, from an input signal, a band of signals including a signal having a specific frequency;
    a second filter that extracts, from the input signal, a band of signals that overlap the band of signals extracted by said first filter, excluding the signal having the specific frequency;
    a first lowpass filter that smoothes an output of the first filter, and outputs the smoothed first filter output signal;

a second lowpass filter that smoothes an output of the second filter, and outputs the smoothed second filter output signal;

a subtractor that subtracts the smoothed second filter output signal from the smoothed first filter output signal, and outputs a subtraction signal; and a judgment circuit that judges whether the tone signal is present or not in the input signal on the basis of the subtraction signal, wherein said judgment circuit comprises:

a first comparator that compares a level of the subtraction signal with a first level at every occurrence of a specified time interval, outputs an ON-signal when the level of the subtraction signal is greater than the first level, and outputs an OFF-signal when the level of the subtraction signal is less than the first level;

a first counter that counts a frequency during which the ON-signal that is output from said first comparator continues, and outputs a first judgment result indicating that the tone signal is present to an output terminal only when the continued frequency is greater than a first threshold frequency level;

a second comparator that compares the level of the subtraction signal with a second level at every occurrence of a specified time interval, outputs the ON-signal when the level of the subtraction signal is greater than the second level, and outputs the OFF-signal when the level of the subtraction signal is less than the second level;

a second counter that counts a frequency during which the OFF-signal that is output from said second comparator continues, and outputs a second judgment result indicating that the tone signal is absent to the output terminal only when the continued frequency is greater than a second threshold frequency level; and a switch that switches the subtraction signal so as to be input to said second comparator when said first counter outputs the first judgment result indicating that the tone signal is present, and switches the subtraction signal so as to be input to said first comparator when said second counter outputs the second judgment result indicating that the tone signal is absent.

6. A tone signal detection circuit as claimed in claim 5, further comprising an electric field strength detection circuit that controls, on the basis of an input electric field strength, a characteristic of said first filter, a characteristic of said second filter, and the first level, the second level, the first threshold frequency level, and the second threshold frequency level of said judgment circuit.

7. A tone signal detection circuit, comprising:

a first filter that extracts, from an input signal, a band of signals including a signal having a specific frequency;

a second filter that extracts, from the input signal, a band of signals that overlap the band of signals extracted by said first filter, excluding the signal having the specific frequency;

a first lowpass filter that smoothes an output of the first filter, and outputs the smoothed first filter output signal;

a second lowpass filter that smoothes an output of the second filter, and outputs the smoothed second filter output signal;

a subtractor that subtracts the second filter output signal from the smoothed first filter output signal, and outputs a subtraction signal;

a third lowpass filter that smoothes the subtraction signal output from the subtractor, and outputs the smoothed subtraction signal; and a judgment circuit that judges whether the tone signal is present or not in the input signal on the basis of the smoothed subtraction signal, wherein said judgment circuit comprises:

a first comparator that compares a level of the subtraction signal with a first level at every occurrence of a specified time interval, outputs an ON-signal when the level of the subtraction signal is greater than the first level, and outputs an OFF-signal when the level of the subtraction signal is less than the first level;

a first counter that counts a frequency during which the ON-signal that is output from said first comparator continues, and outputs a first judgment result indicating that the tone signal is present to an output terminal only when the continued frequency is greater than a first threshold frequency level;

a second comparator that compares the level of the subtraction signal with a second level at every occurrence of a specified time interval, outputs the ON-signal when the level of the subtraction signal is greater than the second level, and outputs the OFF-signal when the level of the subtraction signal is less than the second level;

a second counter that counts a frequency during which the OFF-signal that is output from said second comparator continues, and outputs a second judgment result indicating that the tone signal is absent to the output terminal only when the continued frequency is greater than a second threshold frequency level; and a switch that switches the subtraction signal so as to be input to said second comparator when said first counter outputs the first judgment result indicating that the tone signal is present, and switches the subtraction signal so as to be input to said first comparator when said second counter outputs the second judgment result indicating that the tone signal is absent.

8. A tone signal detection circuit as claimed in claim 7, further comprising an electric field strength detection circuit that controls, on the basis of an input electric field strength, a characteristic of said first filter, a characteristic of said second filter, and the first level, the second level, the first threshold frequency level, and the second threshold frequency level of said judgment circuit.

* * * * *